Figure 1:
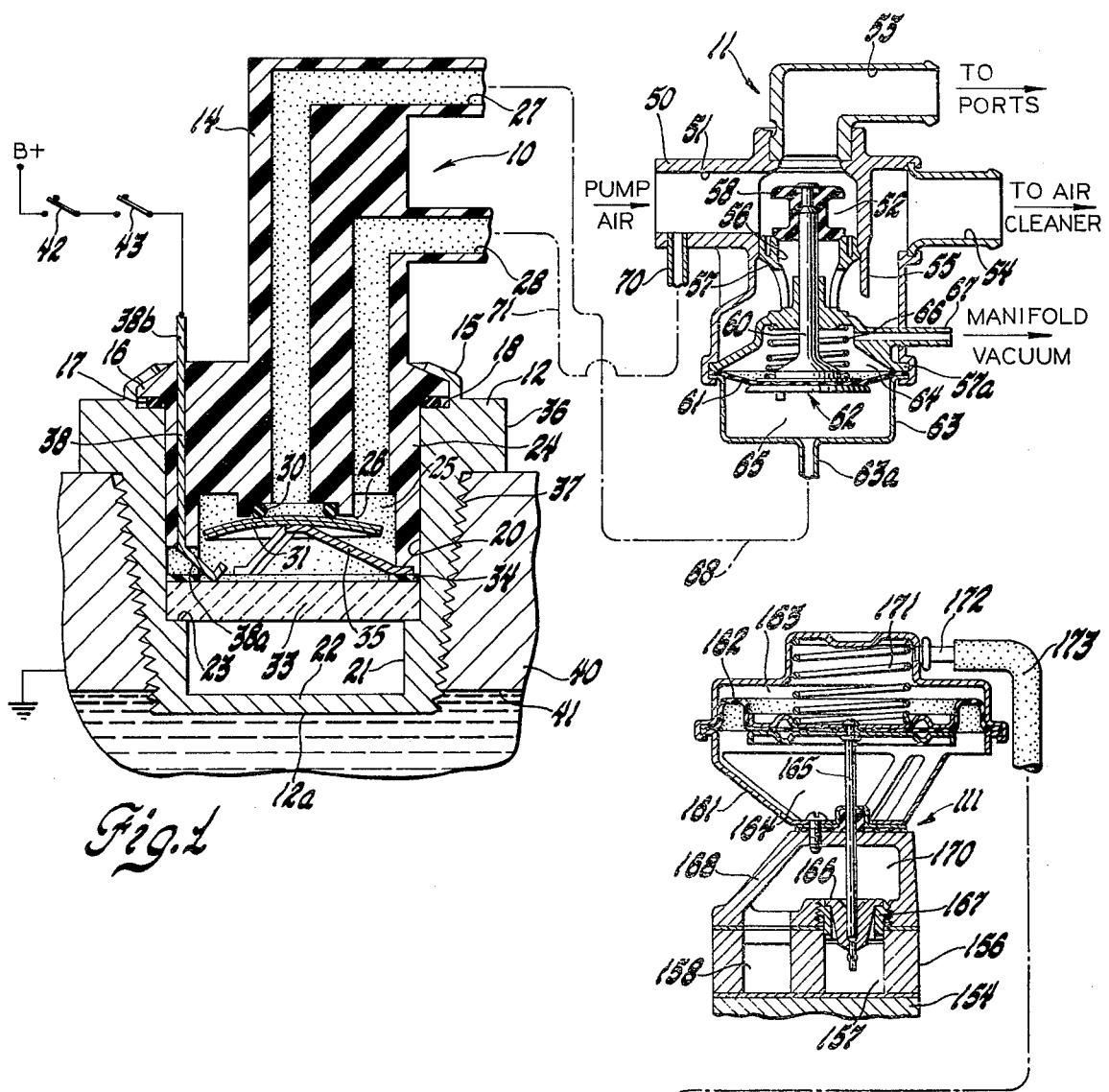

United States Patent [19]
Thornburgh

[11] 4,139,151
[45] Feb. 13, 1979

[54] ELECTRIC THERMAL SWITCH VALVE
[75] Inventor: William F. Thornburgh, Rochester, Mich.
[73] Assignee: General Motors Corporation, Detroit, Mich.
[21] Appl. No.: 769,907
[22] Filed: Feb. 18, 1977
[51] Int. Cl.² ............................................. G05D 23/10
[52] U.S. Cl. .............................. 236/48 R; 123/119 A; 236/68 R; 236/87; 236/101 C
[58] Field of Search ...................... 236/48 R, 68 R, 87, 236/101 B, 101 C, 101 E; 123/119 A; 60/290

[56] References Cited
U.S. PATENT DOCUMENTS

| 3,856,259 | 12/1974 | Doherty, Jr. | 251/11 |
| 4,016,853 | 4/1977 | Bible | 236/101 E X |
| 4,026,464 | 5/1977 | Doherty, Jr. | 236/101 B X |
| 4,029,257 | 6/1977 | Jenkins et al. | 236/101 C X |
| 4,032,071 | 6/1977 | Imoto | 236/101 E |

Primary Examiner—William E. Wayner
Assistant Examiner—William E. Tapolcai, Jr.
Attorney, Agent, or Firm—Arthur N. Krein

[57] ABSTRACT

An electric-thermal switch valve has a body with a first port and at least one second port with a temperature operated valve means including a valve seat and a bi-metal element, responsive to temperature, positioned to cooperate with the valve seat to control flow between the first port and the second port. An electrical heating means, including a semi-conductor, having a positive temperature coefficient of resistance, positioned in the body, is used to heat the bimetal element when energized whereby switching of the bimetal element at a predetermined temperature, will occur as the combined effect of heat sensed by the body and the heat generated by the electrical heating means.

5 Claims, 2 Drawing Figures

U.S. Patent
Feb. 13, 1979
4,139,151

ELECTRIC THERMAL SWITCH VALVE

This invention relates to valves for controlling fluid flow and, in particular, to an electric-thermal switch valve.

In various emission control systems presently used on internal combustion engine powered vehicles, it has been common to use either valves responsive to temperature, such as the operating temperature of a particular component of the engine, or solenoid valves, energized or de-energized as a function of a particular engine operating condition, or both types of valves to control fluid flow in a given system.

A valve in accordance with the invention is intended to serve in place of either a solenoid valve or a conventional temperature responsive valve for turning on or off a vacuum or pressure signal or, for venting a vacuum signal.

It is therefore a primary object of this invention to improve a switch valve having a bimetal element operable against a valve seat whereby the bimetal element is switched as the combined effect of warmup of the valve by thermal contact with another element, such as an engine component, and heat from an electrical heating element in the valve.

Another object of this invention is to improve a valve structure for controlling fluid flow whereby switching of the valve is the combined effect of warmup of the base of the valve, the heat from an electrical heating element in the valve and, the calibration temperature of a bimetal valve element of the valve structure.

A further object of this invention is to improve a temperature responsive valve structure for controlling fluid flow whereby the temperature switching function of a bimetal valve element thereof is time controlled by electrical means.

A still further object of this invention is to improve a temperature responsive valve structure for controlling fluid flow whereby it is operable to serve in place of a conventional solenoid valve.

These and other objects of the invention are obtained by a valve structure which includes a housing adapted to be connected in heat exchange relationship to another element, a temperature operated valve means in the housing including at least one valve seat and a bimetal element coacting therewith, and an electrical heating means, including a semi-conductor having a positive temperature coefficient of resistance associated with the bimetal element, whereby switching of the bimetal element upon it sensing a predetermined temperature will occur as the combined effect of the warmup rate of the housing and the heat generated by the electrical heating means.

Figure 2:
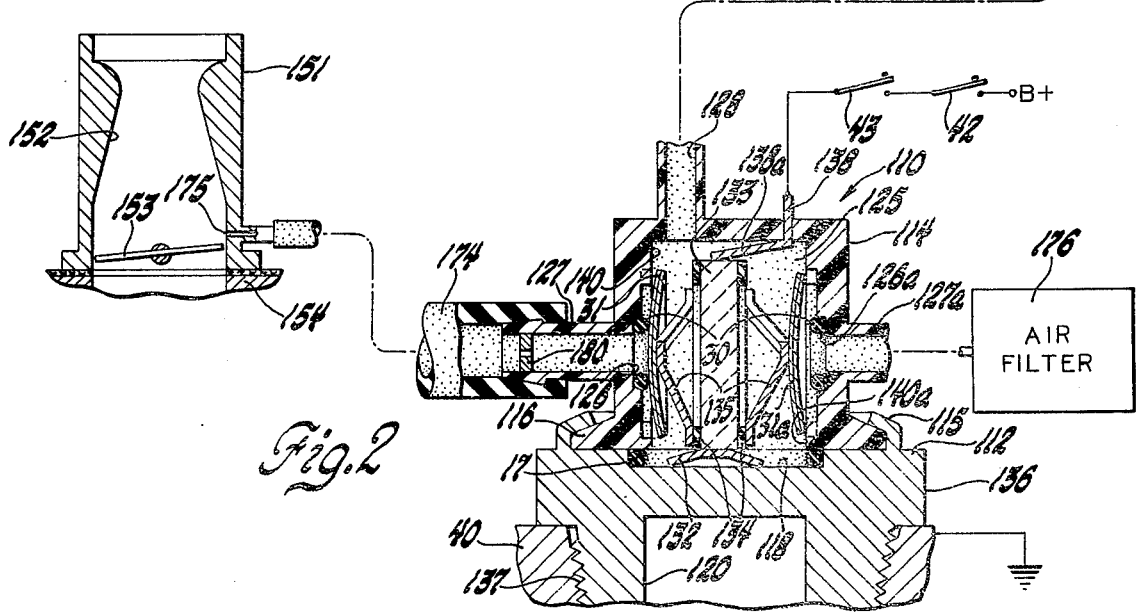

For a better understanding of the invention as well as other objects and further features thereof, reference is had to the following description of the invention to be read in connection with the accompanying drawings, wherein:

FIG. 1 is a cross sectional view of a preferred embodiment of an electric thermal switch valve in accordance with the invention, and showing schematically its use in connection with an emission control system for an internal combustion engine of a vehicle in which an air flow control unit is used to control flow of secondary air to the exhaust ports of the engine; and, FIG. 2 illustrates an alternative embodiment of the subject electric thermal switch valve and showing schematically its use in connection with the exhaust gas recirculation system for the internal combustion engine of a vehicle.

In the system illustrated in FIG. 1, an electric thermal switch valve, in accordance with an embodiment of the invention and generally designated 10, is used to actuate one mode of operation of an air flow control unit 11, the air flow control unit being of the type commonly used to control flow of secondary air from an air pump, not shown, to the exhaust system, also not shown, of an internal combustion engine.

Referring first to the electric thermal switch valve 10 of the invention, it includes a housing which, in the construction illustrated, is a two-part housing formed by a cup-shaped base 12, made of a suitable heat conducting material, such as brass, and a cover 14, preferably made of a material having low electric conductivity, such as a plastic material, suitably secured together as by having the upstanding annular flange 15 of base 12 spun over the intermediate flange 16 of the cover with an 0-ring seal 17 sandwiched between the under side of flange 16 and the upper surface 18 of the base.

Base 12 is provided with a stepped bore therein including a first bore 20 extending from the upper surface 18 and a coaxial bore 21 of reduced diameter which terminates at a lower inner wall 22 in the base, the bores 20 and 21 being interconnected by radial shoulder 23. The cover 14 is provided with an annular lower base portion 24 extending from the flange 16 so as to be telescopically received within the first bore 20 of base 12 and this lower base portion 24 is provided with an open compartment 25 having a depending valve base 26 therein, for a purpose which will become apparent. Cover 14 is also provided with a first passage or conduit 27 having one end thereof opening through valve base 26 into compartment 25 and a second passage or conduit 28 having a portion thereof opening into the compartment 25 radially outward from the valve base. An 0-ring 30 is positioned on the valve base 26 to encircle the conduit 27 to serve as a valve seat for engagement by a heat responsive, bimetal element 31.

As illustrated, a heating element 33, of disk shape and formed of a semi-conductor material having a positive temperature coefficient of resistance, an insulating washer 34 and the leg ends of a spider-shaped spring 35 are sandwiched between the radial shoulder 23 of base 12 and the lower end face of the base portion 24 of cover 14, the spring 35 resiliently supporting the bimetal element 31 in operative relationship to the O-ring valve seat 30. Heating element 33 is suitably fixed, as by a pressed fit, to be in electrical contact with base 12.

In the particular embodiment illustrated, the bimetal element 31 is normally flexed or prestressed into the position shown whereby it engages the O-ring valve seat to block flow through the conduit 27 and is operative when it senses a predetermined elevated temperature to flex or switch in the opposite direction, from that shown, whereby to unseat relative to the O-ring valve seat 30 so as to permit fluid flow through the conduit 27 which is then in fluid communication with the conduit 28 as interconnected by the fluid chamber provided by the compartment 25. As shown, the bimetal element 31 is preferably of circular disk shape and of a diameter so as to be loosely received within the compartment 25 whereby fluid flowing through the conduit 28 into the compartment 25 can readily flow around to opposite sides of the bimetal element so as to substantially equalize fluid pressure acting on this element.

Base 12 is provided with a suitable wrenching head 36 and with a lower shank portion having external threads 37 thereon whereby it can be readily secured in threaded engagement with a component so as to be in thermal heat exchange relationship therewith. In addition, this valve structure is provided with a spring-type, electrical connector 38 extending through the cover 14, one end of the electrical spring connector being suitably bent as at 38a to be biased into electrical contact with the heating element 33 while its opposite end 38b extends outward from the cover 14 in position to be connected to a suitable electrical circuit.

In the use of the subject electric thermal switch valve in an exhaust emission control system, as shown in FIG. 1, the base 12 of this valve is threaded, for example, into a suitable threaded aperture in the inlet manifold 40 of the engine at the coolant water crossover passage 41 therein, whereby the base will be in thermal heat receiving relationship with the inlet manifold and with the coolant water in the passage 41. Preferably, as shown, the bottom 12a of base 12 is in direct contact with the liquid in passage 41.

The electrical connector 38 for this valve, in the construction illustrated, is connected to a voltage source, such as battery B, through the engine ignition switch 42 and a pressure actuated switch 43 which is operatively connected to the transmission, not shown, of the vehicle. Base 12 is suitably grounded, either directly or indirectly, as by having inlet manifold 40 grounded. Switch 43, which is a pressure actuated switch, is operative as a function of hydraulic fluid pressure in the transmission and may be of the type disclosed in U.S. Pat. No. 3,584,521 entitled "Ignition Timing Control" issued June 15, 1971 to Robert S. Tooker and James J. Dawson, the disclosure of which is incorporated herein by reference thereto. However, in the instant arrangement, the switch 43 is such that, when the transmission, not shown, is in a low drive mode of operation, it is open and, when the transmission is in a high drive mode or high drive ration (direct drive) or in reverse, the switch 43 would be closed so that the heating element 33 is energized.

Again with reference to FIG. 1, since the details of the emission control system and of the air flow control unit 11 used therein are not deemed necessary to an understanding of the subject invention, they need not be described in detail herein. However, in the particular construction illustrated, the air flow control unit 11 is generally of the type disclosed in U.S. Pat. No. 3,835,646 entitled "Air Flow Control Unit" issued Sept. 17, 1974 to Ernst L. Ranft, Gordon R. Paddock and Jeremiah J. Murray and, accordingly, for details of the unit 11 and of the emission control system in which it is used, reference is made to this patent which is incorporated herein by reference thereto.

Basically, the air flow control unit 11 includes a housing 50 having a lateral inlet 51 extending to a valve chamber 52. The inlet 51 is connectable to, for example, an engine driven air pump, not shown, whereby secondary air can be delivered to the unit 11. Housing 50 also includes a primary or main outlet 53 in communication at one end with the valve chamber 52 and connectable at its other end to the exhaust manifold of the engine, both not shown, so that, preferably, secondary air is admitted into the exhaust system closely adjacent to the exhaust ports of the engine. In addition, the unit 11 is also provided with a secondary outlet 54 formed in part by passage means 55 in the housing and by passage means 56 formed in an insert 57 positioned in the housing. Secondary outlet 54 is preferably connected to the dirty side of the air cleaner, not shown, for the engine. A valve member or element 58 is supported in the valve chamber 52 for movement in a manner to be described between a first position, as shown in FIG. 1, blocking flow out through the secondary outlet 54 while permitting flow out through the main outlet 53, and a second position blocking flow out through the main outlet 53 while permitting flow out through the secondary outlet 54.

As shown, the valve memeber 58 is secured to the upper end of a valve stem 60 while the lower end of this valve stem is secured to the diaphragm 61 of a divert timing assembly 62 of the type disclosed in the above-identified U.S. Pat. No. 3,835,646. The diaphragm 61 is sandwiched between a lower rim 57a of the insert 57 and the upper flange of a cup-shaped cover 63, with these elements being fixed to the housing as by having the lowr rim of the housing spun over the peripheral edges of these elements. The diaphragm 61 is thus positioned so as to form with the lower portion of the insert 57, a vacuum chamber 64 and with the cover 63, a divert timing chamber 65. A spring 66 positioned in the vacuum chamber 64 is used to normally bias the valve member 58, via the stem 60, to the position shown blocking flow through the secondary outlet 54.

A vacuum fitting 67 formed as a portion of insert 57 is connectable at one end to the intake manifold of the engine, not shown, while its opposite end opens into a vacuum chamber 64. During engine deceleration, manifold vacuum rises abruptly, and the vacuum in chamber 64 increases correspondingly to effect upward movement of the diaphragm 61 against the bias of a spring 66. This upward movement of the diaphragm 61 will cause the valve member 58 to move to a position interrupting air flow out through the outlet 53 to the exhaust manifold and thus prevent backfiring in the exhaust system.

In the construction illustrated, the cover 63 is provided with a conduit fitting 63a whereby the divert timing chamber 65 can be placed in communication via a conduit or hose 68 to the conduit 27 of valve 10. Inlet 51 for the unit 11 is also provided with a conduit fitting 70 for connection by a conduit or hose 71 to the conduit 28 of valve 10, whereby air at inlet pump pressure flowing in inlet 51 can be selectively conveyed to the divert timing chamber 65, as controlled by the valve 10, to effect upward movement of the diaphragm 61, against the bias of spring 66, whereby to move the valve member 58 to a position blocking flow out through the primary outlet 53.

During vehicle operation, the air flow control unit 11 will operate in a conventional manner, as disclosed in the above-identified U.S. Pat. No. 3,835,646, except when the vehilce is operated so that the transmission is in a high drive ratio mode of operation for a predetermined period of time, the output of the air pump can be diverted, as to the air cleaner. In order to permit the air flow control unit 11 to operate in a conventional manner when the transmission is in a low drive mode of operation, the calibration of the bimetal element 31 is such that it will not switch to an open position relative to the O-ring valve seat 30 until it senses a predetermined temperature, which temperature is preferably substantially above the normal temperature of the coolant water in passage 41 during normal engine operation.

With the bimetal element calibrated to effect switching upon its sensing such a predetermined temperature, it will be apparent that switching will not occur until the heating element 33 has been energized for a predetermined period of time. Thus, during vehicle operation, when the transmission is in a high drive mode of operation, switch 43 will be closed to energize the heating element 33, so that after a predetermined period of time, depending on any possible short period down and up shifts of the transmission which may effectively lengthen the time period, the heat generated by the heating element 33, in addition to the temperature of the base 12, will be sensed by the bimetal element 31 causing it to switch to an open position relative to the O-ring valve seat 30. This time function will, of course, depend on the predetermined heat output of the heating element 33, the temperature of the coolant water and the calibration of the bimetal element 31.

When this occurs, the air, at pump discharge pressure in inlet 51, is transmitted to the divert timing chamber 65 to effect upward movement of the diaphragm 61 causing the valve element 58 to move to a position blocking flow out through the primary outlet 53 and thereby diverting air flow out through the secondary outlet 54. Of course, if the transmission is then operated again in a low drive mode of operation, for any length of time during which time the heating element 33 will be de-energized, the coolant water in the passage 41 will cause the temperature sensed by the bimetal element 31 to descend, to again cause the bimetal element 31 to switch back to its original position blocking air flow out through the conduit 27 to the divert timing chamber 65. The bleed passage, not shown, of the divert timing assembly, as described in the above-identified U.S. Pat. No. 3,835,646, will permit pressure in the divert timing chamber 65 to be slowly equalized with that in the vacuum chamber 64 thereby permitting the spring 66 to again bias the valve element 58 to the position shown in FIG. 1 so that secondary air is again delivered to the exhaust system of the engine.

The above-described electric thermal switch valve 10 controlled air injection system is operative to divert the air being injected to the exhaust system into the dirty air side of the air cleaner after the transmission has shifted into high gear plus a time factor, as described above, whereby to improve highway fuel economy.

It will be apparent to those skilled in the art that the bimetal element 31 can either be normally closed relative to the O-ring valve seat 30, as shown in FIG. 1, or it can normally be open, if desired, for a particular application use of the subject electric thermal switch valve 10. It will also be apparent that, if desired, more than one bimetal element and its cooperating valve seat can be used in an electric thermal switch valve, in accordance with the invention.

Thus referring to FIG. 2, there is illustrated an alternate embodiment of an electric thermal switch valve, generally designated 110, having a normally closed, bimetal element associated with a first valve seat and another, normally open, bimetal element associated with a second valve seat, in a construction to be described, with this switch valve shown as being used in association with the exhaust gas recirculation valve 111 for controlling the recirculation of exhaust gas back for induction into an engine.

Referring first to the electric thermal switch valve 110, wherein parts similar to those of the switch valve 10, previously described, are identified by similar reference numbers, this switch valve structure includes a housing formed by base 112 and a cover 114 suitably secured together as by having the upstanding flange 115 of the base spun over the intermediate flange 116 of the cover with an O-ring seal 17 sandwiched between the underside of flange 116 and a counterbored surface 118 provided at the upper end of the base.

The cover 114 is provided with an open compartment 125 that extends from its lower end of the cover so as to form with the base 112 a partly closed chamber for fluid. Cover 114 is also provided with a first passage or conduit 127 having one end thereof opening through a valve base 126 into compartment 125, a second passage or conduit 127a opening through a valve base 126a into compartment 125, these passages or conduits 127 and 127a being preferably axially aligned with each other, and a third passage or conduit 128 also opening into the compartment 125 at a location remote from the passages or conduits 127 and 127a. An O-ring 30 is positioned on each of the valve bases 126 and 126a, each to encircle the conduit associated therewith whereby to serve as a valve seat for the heat responsive, bimetal element 31 and 31a, respectively.

A heating element 133, formed of a semi-conductor material having a positive temperature coefficient of resistance, is supported in position within the compartment 125 by a Belleville-type spring washer support 132 substantially midway between the O-ring valve bases 126 and 126a. In addition, insulating washers 134 are operatively fixed to opposite sides of the heating element 133 whereby the leg ends of the spider-shaped spring 135, used to support the bimetal elements 31 and 31a, can abut against these washers. The bimetal elements 31 and 31a are thus resiliently supported in operative relationship to the O-ring valve bases 126 and 126a, respectively, and in outer peripheral edge abutment relation to the interior walls 140 and 140a of the cover surrounding the O-ring valve bases 126 and 126a, respectively, when the respective bimetal element is in a flexed position out of seating engagement therewith.

As shown, the bimetal element 31 associated with the O-ring on valve base 126 is normally flexed or prestressed into the position shown whereby it engages this O-ring valve seat to block flow through the conduit 127, while the bimetal element 31a is normally flexed or prestressed into its position shown whereby to be out of engagement with the O-ring on valve base 126a to permit flow through the conduit 127a. Both of the bimetal elements 31 and 31a are operative when each senses a predetermined elevated temperature, which may be a separate temperature for each element or, in the embodiment shown, the same temperature for both elements, to flex or switch in the opposite direction, from that shown, so that the bimetal element 31 will unseat relative to the O-ring on valve base 126, while the bimetal element 31a will seat against the O-ring on valve base 126a.

This valve structure is also provided with a spring-type electrical connector 138 extending through the cover 114, with one end thereof positioned outward from the cover for connection to a voltage source, such as battery B, through the previously described switches 42 and 43, while its opposite end is suitably bent as at 138a to be biased into electrical contact with the heating element 133. Heating element 133 is also suitably fixed so as to be in electrical contact with the base 112, as by having the heating element located and supported as sandwiched between the bent end 138a of the electrical connector 138 and the support 132 or, if desired, the support 132 can be soldered both to the base 112 and to the heating element 133.

Base 112, like the base 12, is provided with a suitable wrenching head 136 and with a lower shank portion having external threads 137 thereon whereby the base can be readily secured in threaded engagement with a component so as to be in thermal heat exchange relationship therewith. If desired, the base 112 can be provided with a bore opening 120 extending from the free end of the shank thereof to reduce the weight of the base.

Still referring to FIG. 2, the engine, with which the switch valve 110 and exhaust gas recirculation valve 111 are associated, has a carburetor throttle body 151 with an induction passage 152 therethrough, the flow of an air/fuel mixture, or air alone in the case of a fuel injected engine, flowing through the induction passage as controlled by a throttle valve 153. As is conventional, the throttle body 151 is mounted on the intake manifold 154 of the engine.

The exhaust gas recirculating valve 111 can be mounted directly to the intake manifold or, as shown, it is mounted on an insert or spacer plate 256 which, in turn, is suitably secured to the intake manifold 154. The insert plate 156 is provided with a first runner or chamber 157 therein which is in flow communication with an exhaust crossover passage, not shown, in the intake manifold, and a second runner or chamber 158 which is in flow communication with a riser bore, not shown, extending from the usual induction passage in the intake manifold 154.

In the construction illustrated, the exhaust gas recirculating valve 111 is of the type disclosed in U.S. Pat. No. 3,762,384 entitled "Exhaust Gas Recirculation Valve" issued Oct. 2, 1973 to Edward G. Day and Ernst L. Ranft, the disclosure of which is incorporated herein by reference thereto. This valve 111 includes a motor housing 161 having a circular diaphragm 162 dividing the former into a vacuum chamber 163 and an atmospheric chamber 164. A downwardly projecting valve stem 165 is centrally attached to the diaphragm 162. A valve member 166 is attacheched to the valve stem 165 and has a conical pintle which cooperates with a circular valve seat 167 mounted on a valve body 168 to restrict the flow of exhaust gases from the chamber 157 through an intermediate chamber 170, in the valve body, to the second chamber 158. The housing 161 and the valve body 168 are suitably secured together and the valve body 168 is suitably mounted on the spacer plate 156. A coiled spring 171 disposed in the vacuum chamber 163 serves to normally bias the diaphragm 162 in a direction whereby the valve member 166 is moved to a closed position on the valve seat 167, the position shown in FIG. 2.

A vacuum tube coupling 172 is connected to the housing 161 of the valve 111 to provide a vacuum inlet to the vacuum chamber 163. A hose 173 is connected at one end to the coupling 172 and has its other end connected to the conduit 128 of the switch valve 110. As shown, the conduit 127 of the switch valve is connected by a hose conduit 174 to the induction passage 152 at a port 175 disposed so as to be transversed by the throttle valve 153 during opening movement thereof. In addition, the passage 127a of the switch valve 110 is in communication with the atmosphere as through an air filter 176. With this arrangement, it will be apparent that the vacuum chamber 163 of the valve 111 will be normally placed in communication via the conduit 128, compartment 125 and conduit 127a of the switch valve 110 with the atmosphere since the bimetal element 31a normally open relative to the valve seat 126a.

In a manner similar to that of the switch valve 10, the switch valve 110 would be threaded, for example, into a suitable threaded aperture in the inlet manifold 40 of the engine at the coolant water crossover passage therein whereby the base 112 will be in thermal heat receiving relationship with the inlet manifold and with the coolant water.

Thus, during engine operation, assuming that both the bimetal elements 31 and 31a of the switch valve 110 are calibrated in the same manner as the bimetal element 31 of switch valve 10, when the transmission is in a low drive mode of operation, the bimetal elements 31 and 31a will be in the position shown whereby the vacuum chamber 163 of the valve 111 will be in direct communication with the atmosphere. With atmospheric pressure on opposite sides of the diaphragm 162, the spring 171 will effect seating of the valve element or member 166 blocking discharge from the chamber 157.

However, when the transmission is in a high drive mode of operation, switch 43 will be closed to energize the heating element 133 so that, after a predetermined period of time, as described above, the heat generated by the heating element 133, in addition to the temperature of the base 112, will be sensed by the bimetal elements 31 and 31a so that at a predetermined temperature, they will both switch, the bimetal element 31 switching to an open position relative to the O-ring valve seat 126, and the bimetal element 31a switching to a closed position relative to the O-ring valve seat 126a. At that time, the exhaust gas recirculation valve 111 will then function in a normal manner, as described in the above-identified U.S. Pat. No. 3,762,384 as determined by the value of the ported engine vacuum.

So as to reduce or restrict engine induction vacuum loss, a suitable calibrated orifice 180 can be positioned in the connection between vacuum inlet to the valve 111 and the electric thermal switch valve 110, in the flow path from conduit 127 to the port 175, or in both, the calibrated orifice 180 being only shown as positioned in the conduit 127 in the construction illustrated.

Of course, any time that the transmission is operated in a low drive mode of operation, for a suitable period of time or when engine operation is terminated, the switch 43 will open to thereby de-energize the heating element 133 and, then, if the coolant water causes the temperature sensed by the bimetal elements 31 and 31a to descend sufficiently, these bimetal elements will switch back to their original positions, that is, to positions whereat the bimetal element 31 is again seated to block flow through the conduit 127 and the bimetal element 31a is opened to permit flow through the conduit 127a. This, of course, will cause the valve member 166 of the valve 111 to again seat.

In order to obtain the time controlled function attributed to either the switch valve 10 or switch valve 110, it will be apparent to those skilled in the art that, when using a solenoid valve in lieu of either of these valves, a suitable timer would be required to be used in conjunction with the solenoid valve to obtain this same time controlled function.

It will also be apparent that the time controlled function of the switch valve can be varied, as desired, by appropriate selection of the semi-conductor material relative to the normal temperature environment in which the switch valve will operate so as to obtain a preselected heat output from the heating elements 33 and 133 whereby to obtain the necessary time delay before switching of the bimetal elements is effected which, as previously described, is also related to the operating temperature of a preselected component of the engine or other mechanism with which the switch valve is connected in heat exchange relationship.

What is claimed is:

1. An electric thermal switch valve particularly adapted for connection to a preselected component of an internal combustion engine for use in selectively interconnecting a pneumatic source means to a pneumatic operated device of the engine, said switch valve including a housing having a base portion of heat conducting material, said housing providing a compartment therein and which is adapted to be connected by said base portion in heat exchange relationship to said preselected component of the engine, a temperature operated valve means in said compartment, said valve means including at least one valve seat in said housing through which said pneumatic source means is adapted to be interconnected to said pneumatic operated device and at least one disk-shaped, temperature responsive, bimetal valve member in said compartment which is adapted to be actuated from a normal first position relative to said valve seat to a second position relative to said valve seat when said bimetal valve member senses a predetermined temperature, spring means positioned in said housing in spaced apart relation to said valve seat, said spring means engaging said bimetal valve member to support said bimetal valve member in an operative, sandwiched, position between said valve seat and said spring means for movement into and out of engagement with said valve seat as determined by said normal first position and said normal second position and, electrical heating means, including a heater of semi-conductor material, having a positive temperature coefficient of resistance positioned in said compartment to be in thermal heat exchange relationship to said bimetal valve member and to said base portion whereby switching of said bimetal valve member from said first position to said second position will occur as the combined effect of the warm-up rate of said preselected component of the engine and the heat generated by said electrical heating means.

2. An electric thermal switch valve particularly adapted for connection to a preselected component of an internal combustion engine for use in selectively interconnecting a pneumatic source to a pneumatic operated device, said switch valve including a housing providing an internal compartment having a valve seat extending therein including a conduit passage therethrough, said housing further including a base of heat conducting material adapted to be connected in heat exchange relationship to said preselected component of the engine, a temperature responsive bimetal valve element in said compartment, an electrical heating means including a heater, of semi-conductor material having a positive temperature coefficient of resistance, positioned in said compartment opposite said valve seat in heat exchange relationship with said base, spring means positioned in said compartment with one end of spring means in abutment against said heater, said bimetal valve element being operatively sandwiched between said valve seat and said spring means, said bimetal valve element being adapted to be actuated from a normal first position relative to said valve seat to a second position relative to said valve seat when said bimetal valve member senses a predetermined temperature and thus is operative to control flow through said conduit passage and, said housing further having a conduit therethrough opening into said compartment.

3. An electric thermal switch valve particularly adapted for connection to a selected component of an internal combustion engine, said switch valve including a housing having a base means of heat conducting material, said housing providing an internal compartment having at least one valve seat extending therein, said housing including a conduit passage therethrough opening into said compartment and encircled by said valve seat, an electrical heating means including a heater, of semi-conductor material having a positive temperature coefficient of resistance, positioned in said compartment in spaced relation to said valve seat and in heat exhange relationship with said base means, a temperature responsive bimetal element operatively positioned in said compartment and located adjacent to said valve seat for movement upon flexing of said bimetal valve element into and out of engagement with said valve seat, said housing further including a second conduit passage therethrough opening into said compartment and, said base means including mounting means adapted for connection in heat exchange relationship to said selected component of said engine.

4. An electric thermal switch valve including a housing having at least a base portion thereof of heat conductive material, said housing providing a compartment therein, a first valve seat means positioned in said compartment with a first conduit passage in said housing opening through said first valve seat into said compartment, a second valve seat means positioned in said compartment opposite said first valve seat means with a second conduit passage in said housing opening through said second valve seat means into said compartment, electric heater means including a heater, of semi-conductor material having a positive temperature coefficient of resistance, operatively positioned in said compartment in heat exchange relationhsip with said base portion, a prestressed, heat responsive, first bimetal element and a prestressed, heat responsive, second bimetal element, each operative to flex in an opposite direction from their prestressed condition when sensing a predetermined temperature, said first bimetal element being operatively positioned relative to said first valve seat means for movement into and out of engagement with said first valve seat means, said second bimetal element being operatively positioned relative to said second valve seat means for movement into and out of engagement with said second valve seat means, said first bimetal element and said second bimetal element being operatively positioned in heat exchange relationship to said electric heater means, said housing further having a third conduit passage therethrough opening into said compartment and, said base portion of said housing having attachment means whereby said base portion of said housing is adapted for connection in thermal heat exchange relationship to an associated component.

5. An electric thermal switch valve particularly adapted for connection to a preselected component of an internal combustion engine for use in selectively interconnecting a pneumatic source means to a pneumatic operated device of the engine, said switch valve including a housing having a base portion of heat conducting material adapted to be connected in heat exchange relationship to said preselected component of an engine, said housing providing an internal compartment, said housing including a first conduit opening into said compartment, a second conduit opening into said compartment in spaced apart substantially coaxial relation to said first conduit and a third conduit opening into said compartment, a temperature operated valve means in said compartment, said valve means including a first valve seat through which said first conduit opens into said compartment, a second valve seat through which said second conduit opens into said compartment, a first temperature responsive bimetal valve member operatively associated with said first valve seat, a second temperature responsive bimetal valve member operatively associated with said second valve seat, an electrical heating means, including a heater of semi-conductor material, having a positive temperature coefficient of resistance positioned in said compartment between said first bimetal valve member and said second bimetal valve member and in thermal heat exchange relationship to said base portion of said housing, and spring means including a first spring on one side of said heater and a second spring positioned on the opposite side of said heater operative to support said first bimetal valve member and said second bimetal valve member in operative positions between said first valve seat and said second valve seat, respectively, whereby switching of said first bimetal valve member and said second bimetal valve member will each occur as the combined effect of the warm-up rate of said base portion and the heat generated by said electrical heating means.

* * * * *